US012590697B2

(12) United States Patent
MacNelly et al.

(10) Patent No.: US 12,590,697 B2
(45) Date of Patent: Mar. 31, 2026

(54) DISTRIBUTION RING FOR FUEL IN A BURNER, BURNER HAVING SUCH A DISTRIBUTION RING AND DRYING DRUM HAVING SUCH A BURNER

(71) Applicant: Benninghoven Zweigniederlassung der Wirtgen Mineral Technologies GmbH, Wittlich (DE)

(72) Inventors: Steven MacNelly, Büchel (DE); Dietmar Zimmer, Longkamp (DE); Torsten Martini, Morbach-Gutenthal (DE)

(73) Assignee: BENNINGHOVEN ZWEIGNIEDERLASSUNG DER WIRTGEN MINERAL TECHNOLOGIES GMBH, Wittlich (DE)

( * ) Notice: Subject to any disclaimer, the term of this patent is extended or adjusted under 35 U.S.C. 154(b) by 536 days.

(21) Appl. No.: 18/156,517

(22) Filed: Jan. 19, 2023

(65) Prior Publication Data

US 2023/0228413 A1 Jul. 20, 2023

(30) Foreign Application Priority Data

Jan. 20, 2022 (DE) ..................... 10 2022 200 625.9

(51) Int. Cl.
*F23D 1/02* (2006.01)
*F26B 9/06* (2006.01)
*F26B 23/02* (2006.01)

(52) U.S. Cl.
CPC .................. *F23D 1/02* (2013.01); *F26B 9/06* (2013.01); *F23D 2201/10* (2013.01); *F23D 2900/01001* (2013.01); *F23D 2900/21* (2013.01); *F26B 23/02* (2013.01)

(58) Field of Classification Search
CPC .................. F23D 1/02; F23D 2201/10; F23D 2900/01001; F23D 2900/21; F23D 1/00; F23D 14/20; F23D 14/22; F23D 14/24
USPC .......................................................... 431/187
See application file for complete search history.

(56) References Cited

U.S. PATENT DOCUMENTS 6,652,268 B1 * 11/2003 Irwin ...................... F23D 14/24 431/115
2008/0041060 A1 * 2/2008 Nilsson ..................... F23R 3/20 60/737
2008/0280242 A1 * 11/2008 Swanson ................... F23D 1/00 431/182
2008/0280243 A1 11/2008 Swanson et al.
2009/0126368 A1 * 5/2009 Patel ......................... F02C 7/22 60/740

(Continued)

FOREIGN PATENT DOCUMENTS

FR 612480 A 10/1926
GB 2085575 A 4/1982

*Primary Examiner* — Ko-Wei Lin
(74) *Attorney, Agent, or Firm* — McGlew and Tuttle, P.C.

(57) ABSTRACT

A distribution ring for fuel in a burner (7) includes a hollow body (21) which is configured to be annular with respect to a longitudinal axis (22), a feed spigot (23) which is connected to the hollow body (21) and is intended for feeding the fuel into the hollow body (21), and a plurality of discharge spigots (25) for discharging the fuel from the hollow body (21) to the burner (7). The discharge spigots (25) are each arranged externally at the hollow body (21) in the radial direction of the longitudinal axis (22).

18 Claims, 9 Drawing Sheets

(56) References Cited

U.S. PATENT DOCUMENTS

| | | | | |
|---|---|---|---|---|
| 2015/0226431 A1* | 8/2015 | Ristic | F23Q 3/00 | 431/258 |
| 2019/0293285 A1* | 9/2019 | Nett | F23L 9/04 | |
| 2020/0191381 A1* | 6/2020 | George | F23K 5/00 | |
| 2022/0390108 A1* | 12/2022 | Fleifil | F23D 14/24 | |
| 2024/0102648 A1* | 3/2024 | Sumi | F24H 1/40 | |

* cited by examiner

DISTRIBUTION RING FOR FUEL IN A BURNER, BURNER HAVING SUCH A DISTRIBUTION RING AND DRYING DRUM HAVING SUCH A BURNER

CROSS REFERENCE TO RELATED APPLICATIONS

This application claims the benefit of priority under 35 U.S.C. § 119 of German Application DE 10 2022 200 625.9, filed, Jan. 20, 2022. The contents of German patent application DE 10 2022 200 625.9 is incorporated by reference.

TECHNICAL FIELD

The invention relates to a distribution ring for fuel in a burner, a burner having such a distribution ring and a drying drum having such a burner.

BACKGROUND

From the prior art, burners for combusting solids, in particular pulverized lignite, are known in which the pulverized lignite is distributed via a so-called distribution ring and fed to the burner flame by means of fuel nozzles. During the operation of the distribution ring, blocking of the fuel nozzles by the pulverized lignite may occur, which negatively affects in particular the burner flame, in particular the so-called flame pattern of the burner flame. In particular, the flame length is reduced. In particular, the formation of the flame geometry is asymmetrical. This results in, in particular, incomplete, asymmetrical, inconsistent and inefficient combustion.

SUMMARY

It is an object of the invention to improve fuel combustion in a burner, in particular by reliable and uniform fuel supply.

This object is achieved by a distribution ring for fuel having features according to the invention, by a burner having features according to the invention and by a drying drum having features according to the invention.

The essence of the invention is that a distribution ring for fuel in a burner has a hollow body which is configured to be annular with respect to a longitudinal axis and has a plurality of discharge spigots connected thereto, wherein the discharge spigots are each arranged externally at the hollow body in the radial direction with respect to the longitudinal axis. According to the invention, it has been found that this prevents a material accumulation in the distribution ring, in particular in the hollow body. It has been recognized that particles of the fuel that are fed into the distribution ring by means of compressed air are displaced radially outwards, in particular in the direction of the radial outer side wall of the hollow body, due to the centrifugal forces of the fluid flow in the distribution ring. Due to the fact that the discharge spigots are arranged externally at the hollow body in the radial direction, i.e. at a maximum radial distance in relation to the longitudinal axis, an automatic discharge of the fuel particles from the hollow body via the discharge spigots is guaranteed. Fuel distribution is uncomplicated and fail-safe.

Due to the fact that blocking of the discharge spigots is avoided, an evenly distributed fuel supply is guaranteed. The flame pattern thus produced is homogeneous and in particular symmetrical with respect to the longitudinal axis. The distribution ring according to the invention ensures efficient and in particular complete combustion, in particular combustion without residues.

A feed spigot that is connected to the hollow body serves to feed the fuel into the hollow body. In particular, the feed spigot enables the fuel to be fed into the annular hollow body in a defined manner, in particular in a tangential direction.

The fuel is in particular a solid, in particular lignite, hard coal, sewage sludge and/or biomass such as biofibers, in particular wood fibers, in particular wood dust and/or food leftovers.

The distribution ring has at least three, in particular at least four, in particular at least six, in particular at least eight, in particular at least ten, in particular at least twelve, in particular at least sixteen, in particular at least twenty and in particular at least twenty-four discharge spigots. In particular, at most one hundred discharge spigots are arranged at the distribution ring. It is advantageous if there is an even number of discharge spigots. In this case, a symmetrical arrangement of the discharge spigots along the hollow body is possible, in particular in such a manner that the discharge spigots are arranged in pairs diametrically opposite each other with respect to the longitudinal axis at the distribution ring. The number of discharge spigots may also be odd.

A distribution ring according to a further aspect has an increased reliability in the automatic discharge of the fuel particles. In particular, it has been found that a polygonal inner contour of the hollow body ensures advantageous particle guidance and particle discharge via the discharge nozzles. The polygonal inner contour is in particular quadrangular, in particular rectangular or trapezoidal or in the form of a parallelogram. The polygonal inner contour may also be an irregular polygon, in particular an irregular quadrangle. It is particularly advantageous if an outer edge of the inner contour that is oriented in the radial direction is oriented parallel to the longitudinal axis, at least in sections and in particular completely. This ensures that, in relation to the radial direction with respect to the longitudinal axis, the fuel particles are not undesirably pushed further radially outwards, which would be a hindrance to the automatic discharge of the fuel particles.

Alternatively, it is possible that at least one edge of the inner contour is curved at least in sections. It is advantageous if the curvature is configured to be concave in relation to the interior space surrounded by the hollow body.

A distribution ring according to a further aspect enables an improved, in particular more uniform discharge of the fuel into the burner flame. In particular, a circumferential angle between two adjacent discharge spigots is identical, in particular for all discharge spigots.

A distribution ring according to a further aspect improves the directed discharge of the fuel into the burner flame. The discharge spigots are directed with their respective spigot longitudinal axis towards the center, i.e. inclined towards the longitudinal axis. The relevant angle of inclination is greater than 0° and less than 90° (the angle of inclination (n), wherein $0^\circ < n < 90^\circ$). The relevant angle of inclination (n) may be $15^\circ < n < 750$ or, more particularly, $300 < n < 60^\circ$. It is advantageous if the spigot longitudinal axis and the longitudinal axis of the hollow body are arranged in one common plane.

A distribution ring according to a further aspect enables an improved homogeneity of the flame formation. The spigot longitudinal axis of at least a plurality of and in particular of all discharge spigots intersect at one point which is in particular located on the longitudinal axis.

A distribution ring according to a further aspect enables an uncomplicated construction. In particular, the distribution ring can be configured essentially in one piece with the discharge spigots. A nozzle attachment is detachably mounted, in particular screwed, on each discharge spigot. The respective nozzle attachment enables improved discharge of the fuel particles. The respective nozzle attachment can have a complex geometry. Due to the fact that the nozzle attachment is manufactured separately and in particular independently of the hollow body, the manufacture of the nozzle attachment is possible in a flexible manner.

A distribution ring according to a further aspect enables targeted conveyance of the fuel particles in the axial direction, in particular towards the discharge spigots.

In a distribution ring according to a further aspect, the axial conveyance of the fuel particles is improved.

A distribution ring according to a further aspect enables, in particular continuous, axial conveyance of the fuel particles. In particular, the axial extension of the hollow body decreases in the conveying direction of the fuel linearly.

A burner according to a further aspect has substantially the advantages of the distribution ring, reference to which is hereby made. In particular, the distribution ring is connected with the feed spigot to a primary fuel feed (in short: fuel feed). The fuel feed comprises in particular a fuel source and/or a supply line. The fuel supply may be carried out by means of pneumatic conveyance.

A drying drum according to a further aspect has substantially the advantages of the burner, reference to which is hereby made.

In particular, an end wall of the drying drum is configured in such a manner that a collision between the end wall, the burner head and the fuel feed is avoided. This is achieved in particular by the end wall of the drying drum having an opening for the burner head and for the fuel feed, which is in particular larger than the outer dimension of the burner head and fuel feed. In particular, one single opening is arranged in the end wall in which the burner head and the fuel feed are arranged. The opening is in particular essentially keyhole-shaped.

Both the features indicated in the patent claims and the features indicated in the embodiment example of a distribution ring according to the invention are each suitable, either on their own or in combination with one an-other, for further embodying the subject matter according to the invention. The respective combinations of features do not constitute a re-striction with regard to the further embodiments of the subject matter of the invention, but are essentially merely exemplary in character.

Further features, advantages and details of the invention will be apparent from the following description of embodiment examples based on the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
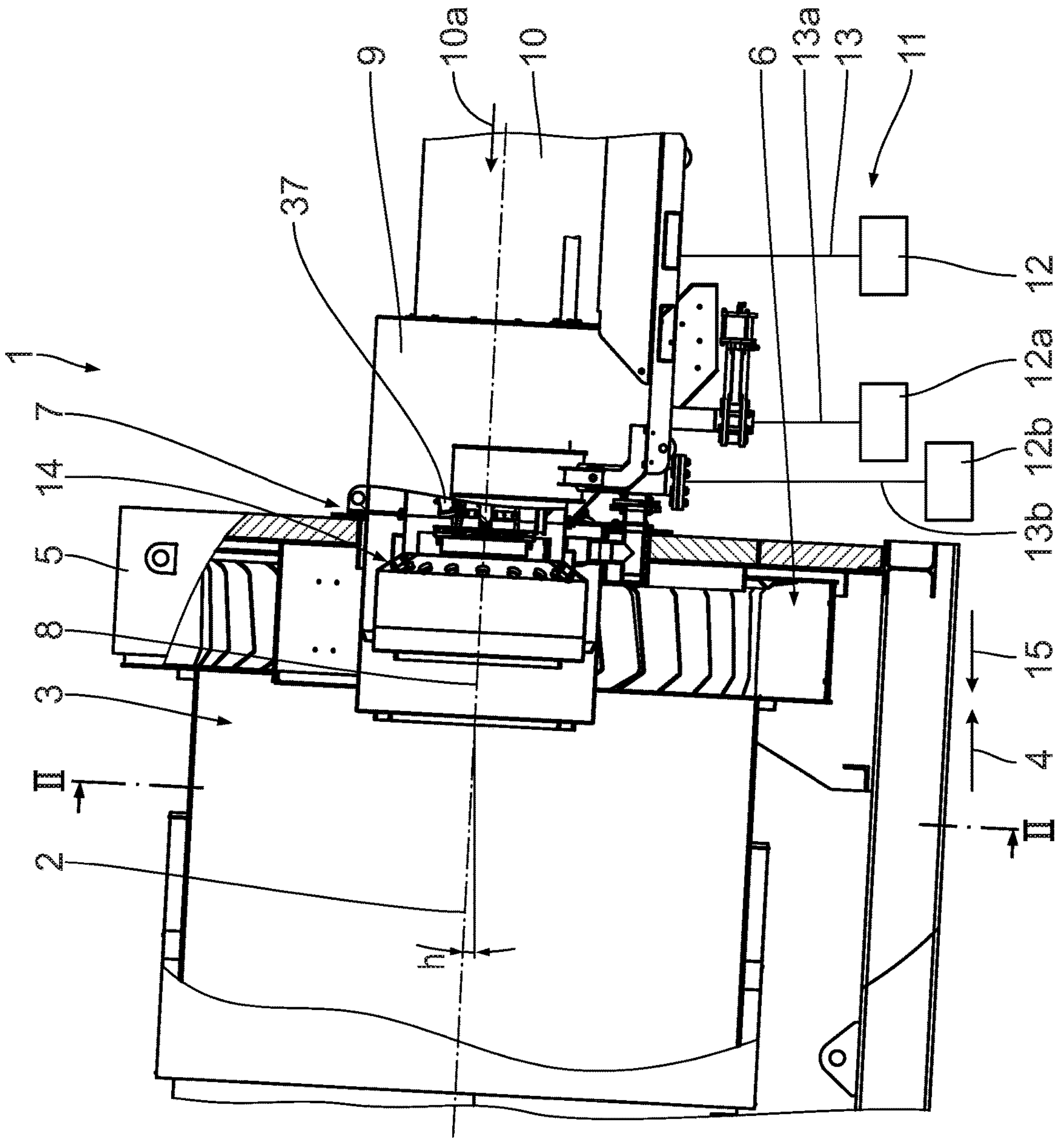
FIG. 1 is a perspective, partially sectioned view of a drying drum with a burner having a distribution ring according to the invention.
Figure 2:
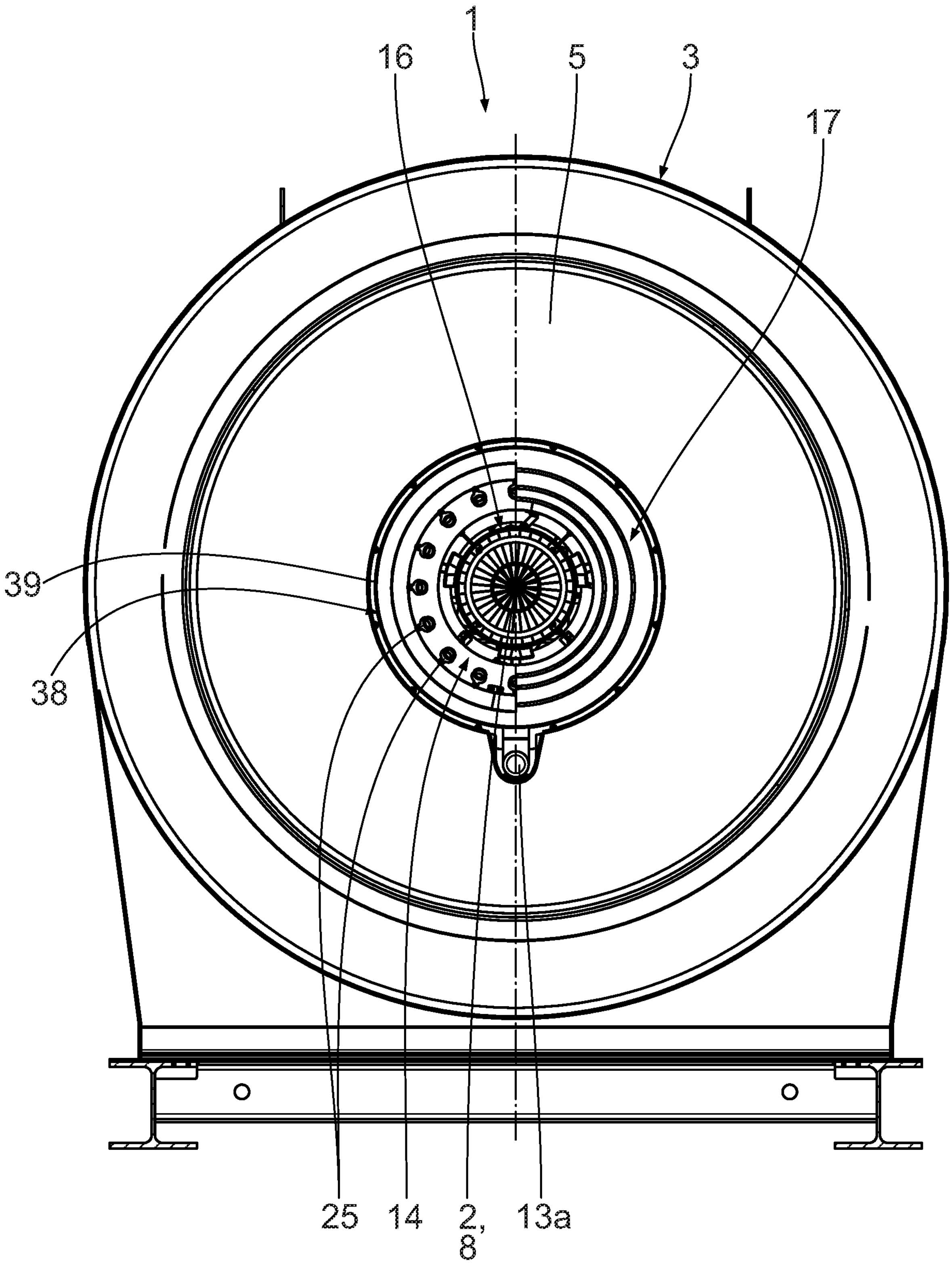
FIG. 2 is a partially sectioned view according to section line II-II in FIG. 1.
Figure 3:
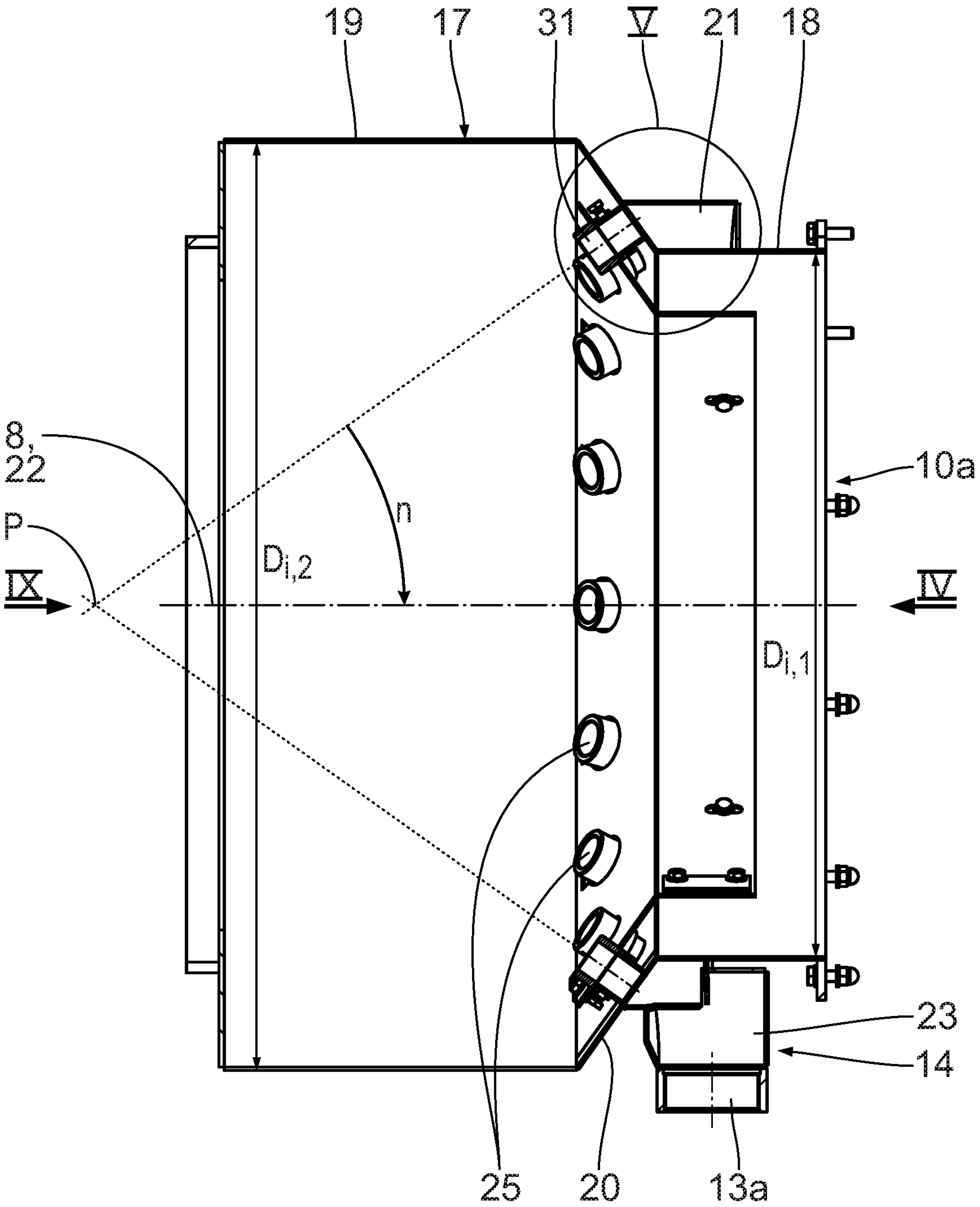
FIG. 3 is an enlarged, partially sectioned view of the distribution ring on a burner head according to FIG. 1.

Referring to the drawings, an apparatus marked 1 in FIGS. 1 and 2 as a whole comprises a drying drum 3 which can be driven in rotation about an axis of rotation 2 for drying and/or heating material, in particular material for asphalt production, in particular rock material, old asphalt granulate and/or aggregates. The drying drum 3 is essentially configured to be hollow-cylindrical. The axis of rotation 2 is arranged with respect to the horizontal at an angle of inclination h which is in particular greater than 0° and in particular less than 10°, in particular less than 5° and in particular less than 3°.

As a result of the inclination of the drying drum 3, the material to be dried is conveyed in the drying drum 3 along a material conveying direction 4, which is oriented from left to right according to FIG. 1. A material outlet 6 is arranged at an end wall 5 of the drying drum 3, shown on the right in FIG. 1, by means of which material outlet 6 the dried material is discharged from the drying drum 3. The material outlet 6 can be arranged at different positions in the circumferential direction around the axis of rotation 2. It is also possible to arrange the material outlet 6 at a number of different positions.

A material inlet is arranged at a second end wall opposite the end wall 5, which is not shown in FIG. 1, in order to feed the material to be dried to the drying drum 3.

A burner 7 is arranged at the end wall 5 and in particular fastened to the end wall 5 and in particular integrated into the end wall 5. In particular, the end wall 5 has an opening through which the burner 7 is guided and projects at least partially into an interior space surrounded by the drying drum 3.

The burner 7 has a burner housing 9 having a burner longitudinal axis 8, which burner housing 9 can be arranged in particular parallel and in particular concentrically to the axis of rotation 2 at the end wall 5 of the drying drum 3. The burner housing 9 is essentially configured to be hollow-cylindrical and has an air supply 10 and a secondary fuel supply 11 for secondary fuel and/or for support fuel. The secondary fuel supply 11 comprises a secondary fuel source, in particular a secondary fuel storage container 12, which is connected to the burner 7 by means of a secondary fuel supply line 13.

Furthermore, a primary fuel supply line is connected to the burner 7, which primary fuel supply line has a primary fuel source **12*a* and a primary fuel supply line 13*a* connected thereto. For the sake of simplicity, the primary fuel source will be referred to as fuel source 12*a* and the primary fuel supply line as fuel supply line 13*a*** in the following.

In the burner 7, in particular in the burner housing 9, a distribution ring 14 is arranged for the distributed supply of the fuel in the burner 7. The distribution ring 14 is connected to the fuel supply line 13*a*, which leads to the fuel source 12*a*. The distribution ring 14 is arranged, in particular concentrically to the burner longitudinal axis 8.

In addition, a further secondary fuel supply line is connected to the burner 7, which, like the secondary fuel supply line 11, serves to supply secondary fuel and/or support fuel. The further secondary fuel supply comprises a further secondary fuel storage container 12*b*, which is connected to the burner 7 by means of a further secondary fuel supply line 13*b*.

The burner 7 also has a pilot burner 37, which is shown purely schematically in FIG. 1. The pilot burner 37 is arranged inside the burner housing 9. The pilot burner 37 can be variably arranged in particular within the burner housing 9, in particular continuously or by means of a fastening device which specifies a number of discrete fastening positions. The variable arrangeability of the pilot burner 37 is in particular related to a direction parallel and/or radial and/or in circumferential direction with respect to the burner longitudinal axis 8. The pilot burner 37 is in particular fastened to an inner side of the burner housing 9. The pilot burner 37 serves to ignite a burner flame.

In operation, the burner 7 generates a burner flame that extends from the burner 7 into the interior space of the drying drum 3. By means of the burner 7 the heat is supplied along a heat supply direction 15 which is oriented opposite to the material conveying direction 4 according to FIG. 1. The drying drum 3 shown in FIG. 2 is operated in the counter-current method. It is understood that a configuration of the drying drum 3 is possible in which the material conveying direction 4 and the heat supply direction 15 are oriented in the same direction, i.e. the drying drum 3 is operated in the cocurrent method. A drying drum of this type is referred to as a parallel drum.

A swirling element 16 is arranged concentrically to the burner longitudinal axis 8. The swirling element 16 serves to swirl the air supplied by means of the air supply 10, in particular the sucked-in ambient air 10*a*, in particular in a tangential direction with respect to the burner longitudinal axis 8. The swirling element 16 can be configured as a baffle plate and in particular have a guide wheel. The swirling element 16 is configured in particular in such a manner that the sucked-in ambient air 10*a* is mixed with the supplied fuel, in particular solid fuel, and/or possible secondary fuel and/or support fuel in such a manner that the ignition properties and/or combustion properties of the mixture are improved and in particular optimized. The ignition properties and/or combustion properties are improved if the mixture has a high homogeneity. In particular, the mixture has a high homogeneity when a uniform and in particular a complete combustion of the fuel in the mixture takes place. A complete combustion can thus be controlled in particular by the fact that no more fuel components are contained in the exhaust gas current leaving the drying drum 3. During the operation of the drying drum 3, it may be necessary for the drying drum 3 to be operated at different operating points, wherein the different operating points can be accessed in a targeted manner by means of a system control.

In a plane perpendicular to the axis of rotation 2, the end wall 5 has an opening 38 which is essentially configured in the shape of a keyhole.

The opening 38 has an upper circular section in which the burner head 17 is arranged. An inner diameter of the circular section is larger than an out-er diameter of the burner head 17, so that a circumferential annular gap 39 results between the opening 38 and the burner head 17. The burner head 17 and the opening 38 are in particular arranged concentrically to each other and in particular each oriented concentrically with respect to the axis of rotation 2.

In a lower region, the circular section of the opening 38 passes into a U-shaped molding. The fuel supply line 13*a* is guided into the drying drum 3 through the U-shaped molding. The U-shaped molding has a circumferential gap with respect to the fuel supply line 13*a*. Correspondingly, there is an annular gap 39 running along the inner contour of the opening 38, in particular also along the U-shaped molding.

In the following, the distribution ring 14 is explained in more detail with reference to FIGS. 3 to 9.

The distribution ring 14 is arranged at a burner head 17 and integrated therein at least in sections. The burner head 17 is configured to be sleeve-shaped and has two cylinder sections 18, 19 that are arranged one behind the other along the burner longitudinal axis 8 and are connected to each other by means of a cone section 20. The burner head 17 is arranged in the burner 7 such that the first cylinder section 18 is arranged facing the air supply 10 and the second cylinder section 19 is arranged facing the drying drum 3. The first cylinder section 18 has a first inner diameter $D_{i,1}$. The second cylinder section 19 has a second inner diameter $D_{i,2}$, which is larger than the first inner diameter $D_{i,1}$. In particular, the following applies: $1.0 \cdot D_{i,1} < D_{i,2} < 2.0 \cdot D_{i,1}$, in particular $1.05 \cdot D_{i,1} < D_{i,2} < 1.5 \cdot D_{i,1}$, in particular $1.1 \cdot D_{i,1} < D_{i,2} < 1.3 \cdot D_{i,1}$.

The distribution ring 14 serves for the distributed supply of the fuel, i.e. of fuel particles, in particular solid particles, into the burner 7, in particular into the burner head 17 and in particular into the second cylinder section 19.

The distribution ring 14 has a hollow body 21 which is annular with respect to a longitudinal axis 22 of the distribution ring 14. The distribution ring 14 is arranged concentrically at the burner head 17 and thus concentrically in the burner 7. This means that the longitudinal axis 22 and the burner longitudinal axis 8 coincide.

A feed spigot 23 is connected to the hollow body 21. In particular, the feed spigot 23 is integrally formed on the hollow body 21. The feed spigot 23 is in particular directly connected to the fuel supply line 13 and in particular connected thereto.

The feed spigot 23 is arranged eccentrically to the longitudinal axis 22. The feed spigot 23 extends away from the hollow body 21 along a radial direction relative to the longitudinal axis 22. In the region of an opening point 24 of the feed spigot 23 into the hollow body 21, the feed spigot 23 has a curvature. As a result of the curvature, a fluid current supplied to the hollow body 21, in particular a fuel-particle-air mixture, is deflected. The fuel-air mixture initially flows in the feed spigot 23 along the radial direction R and is then deflected towards the opening point 24 in the tangential direction T as a result of the curvature and fed into the hollow body 21.

The hollow body 21 defines a substantially circular flow direction for the fuel particles around the longitudinal axis 22.

The hollow body 21 has a plurality of discharge spigots 25 through which the fuel is discharged to the burner 7 and in particular into the burner head 17. According to the embodiment example shown, the hollow body 21 has sixteen discharge spigots 25 which are arranged on the distribution ring 14 equally spaced apart from each other in the circumferential direction about the longitudinal axis 22. It is understood that more or less than sixteen discharge spigots 25 may be present and/or arranged at different distances from each other in the circumferential direction. According to the embodiment example shown, the discharge spigots 25 are all arranged on a common circular line around the longitudinal axis 22, i.e. each at an identical radial distance with respect to the longitudinal axis 22. It is also possible that individual discharge spigots 25 are arranged at different radial distances from the longitudinal axis 22.

According to the embodiment example shown, all discharge spigots 25 are of identical configuration. It is also possible that individual or all discharge spigots 25 are configured differently, in particular with regard to their geometry.

The discharge spigots 25 are each arranged externally at the hollow body 21 in the radial direction with respect to the longitudinal axis 22. This radially outward arrangement is evident in particular from the illustrations in FIGS. 3 and 5.

The hollow body 21 has a polygonal inner contour. According to the embodiment example shown, the inner contour is quadrangular. The inner contour has an outer edge 26 located on the outside with respect to the radial direction of the longitudinal axis 22 and an inner edge 27 located on the inside, which are connected to each other via two axial edges 28 and 29 that are spaced apart from each other in the axial direction. According to the embodiment example shown, the second axial edge 29, which is arranged in the region of the cone section 20 and is in particular defined by the second cone section 20, is arranged to be inclined with respect to a normal plane of the longitudinal axis 22. The first axial edge 28, which is arranged in particular in the region of the first cylinder section 18, is oriented in particular parallel to a normal plane of the longitudinal axis 22.

However, it is also conceivable that the two axial edges 28, 29 are orient-ed parallel to each other.

The discharge spigot 25 is directly connected to the hollow body 21 via a through-opening 30 in the cone section 20. The through-opening 30 is arranged at the hollow body 21 in such a manner that it is arranged out-side in the radial direction.

The discharge spigots 25 are each configured to be hollow-cylindrical and have a spigot longitudinal axis 31, which are each arranged inclined at an angle of inclination n with respect to the longitudinal axis 22. According to the embodiment example shown, the angle of inclination n is about 40°. It is understood that the angle of inclination n may vary, in particular depending on the position of the respective discharge spigot 25 and in particular depending on the number of discharge spigots 25. Additionally, or alternatively, the angle of inclination n may also vary in dependence on the fuel used, in particular the solid fuel used, and in particular in dependence on a combination of different fuels. It is particularly advantageous if the angle of inclination n is identical for each discharge spigot 25 and the spigot longitudinal axes 31 intersect at a point P which is located on the longitudinal axis 22.

In particular, in each case one spigot longitudinal axis 31 is arranged in a common radial plane with the longitudinal axis 22. If, as in the embodiment shown, an even number of discharge spigots 25 are provided and in each case two discharge spigots 25 are arranged diametrically opposite each other with respect to the longitudinal axis 22, the spigot longitudinal axes 31 of the opposite discharge spigots 25 are arranged together with the longitudinal axis 22 in a common radial plane.

Figure 5:
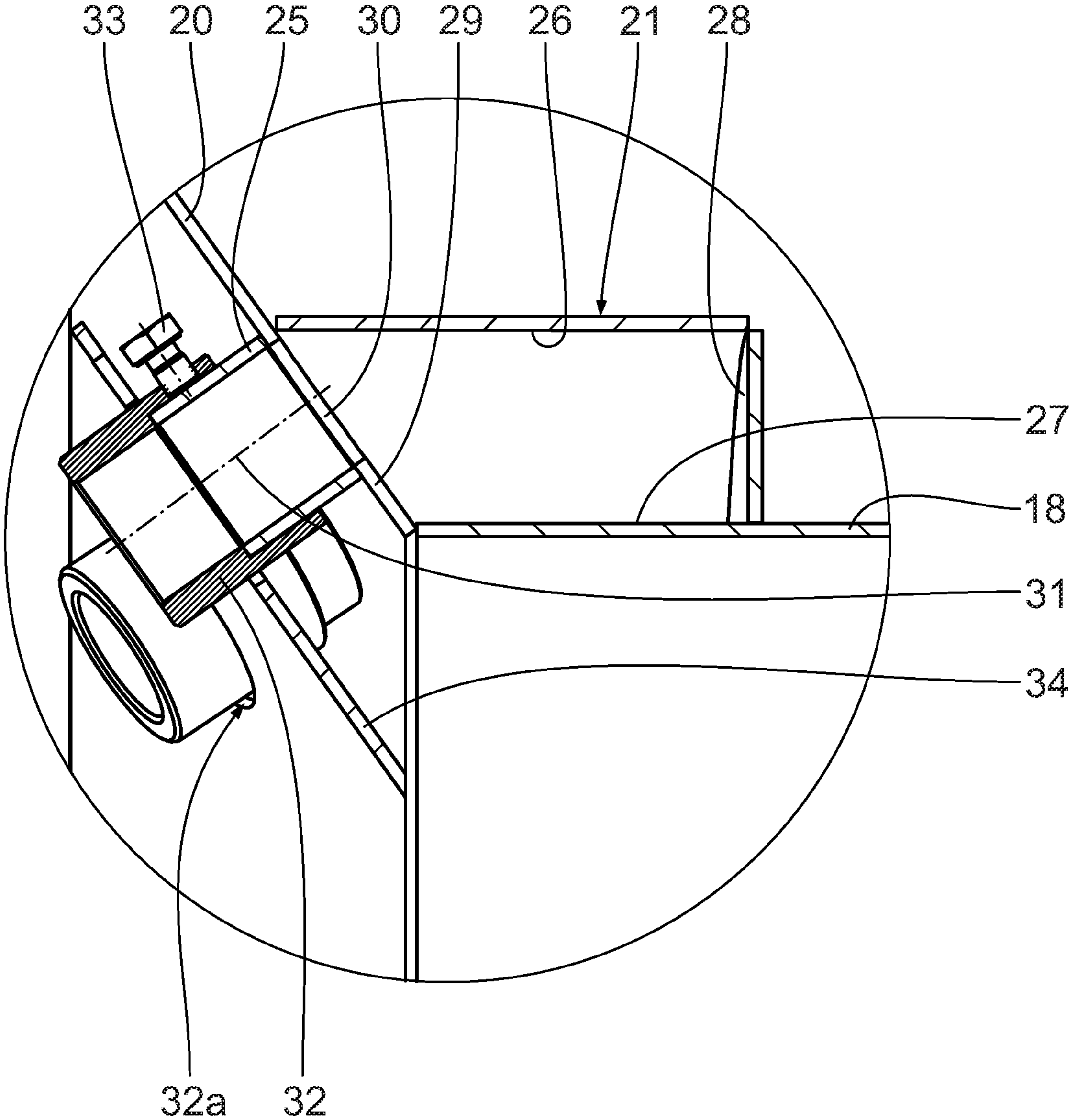
FIG. 5 is an enlarged detail view of detail V in FIG. 3.

As can be seen in particular from FIG. 5, a nozzle attachment 32 is arranged at each discharge spigot 25 and in particular is placed onto each discharge spigot 25. The nozzle attachment 32 enables in particular a targeted and directed fuel supply. The nozzle attachment 32 has a slip-on section whose inner contour corresponds to an outer contour of the dis-charge spigot 25. In addition, the slip-on section is configured with an axial shoulder which serves as an axial stop along the spigot longitudinal axis 31. For fastening, in particular in the axial direction with respect to the spigot longitudinal axis 31, the nozzle attachment 32 has a transverse bore into which a retaining screw 33 is screwed and which serves to clamp the nozzle attachment 32 to the discharge spigot 25. The nozzle attachment 32 is optional and can also be omitted, in particular depending on the properties of the fuel used.

The nozzle attachment 32 is guided through a corresponding opening in a cone cover 34 in the burner head 17. An annular air gap 32*a* is formed between the outside of the nozzle attachment 32 and the opening. Air, in particular sucked-in ambient air 10*a*, can flow through the air gap 32*a* from the annular space between the cone section 20 and the cone cover 34 to the burner flame. It is advantageous if the air gap 32*a* is configured depending on the geometry of the nozzle attachment 32 and/or the opening in the cone cover 34 in such a manner that the flame geometry is un-disturbed by means of the air flowing in through the air gap 32*a*. The cone cover 34 is oriented substantially parallel to the cone section 20 of the burner head 17. In particular, the opening in the cone cover 34 is configured in such a manner that accessibility to the retaining screw 33 from the interior space of the burner head 17 is possible.

The nozzle attachment 32 serves in particular to guide the fuel, in particular the solid fuel, through the cone cover 34. If no nozzle attachment 32 is arranged at the discharge spigot 25, the resulting air gap 32*a* is configured in such a manner that the flame geometry is not permanently disturbed by inflowing air, in particular sucked-in ambient air 10*a*.

The distribution ring 14 has an axial extension which is oriented parallel to the longitudinal axis 22. The axial extension is defined by the distance between the axial edges 28, 29. If, as in the present embodiment example, the axial edges 28, 29 are oriented at different angles of inclination to each other, the axial extension results as an average value between a maximum axial extension and a minimum axial extension. In the embodiment example shown, the maximum axial extension is given at the outer edge 26 and the minimum axial extension at the inner edge 27.

According to the embodiment example shown, the axial extension is at a maximum at the opening point 24 and decreases in the conveying direction of the fuel, i.e. from the feed spigot 23, in particular in the circumferential direction around the longitudinal axis 22, towards the discharge spigots 25. In particular, the axial extension decreases continuously along the conveying direction and in particular linearly. This ensures that the fuel is automatically conveyed in the axial direction, i.e. towards the discharge spigots 25. The discharge of the fuel from the hollow body 21 via the discharge spigots 25 is thus evenly distributed and thus improved.

Figure 6:
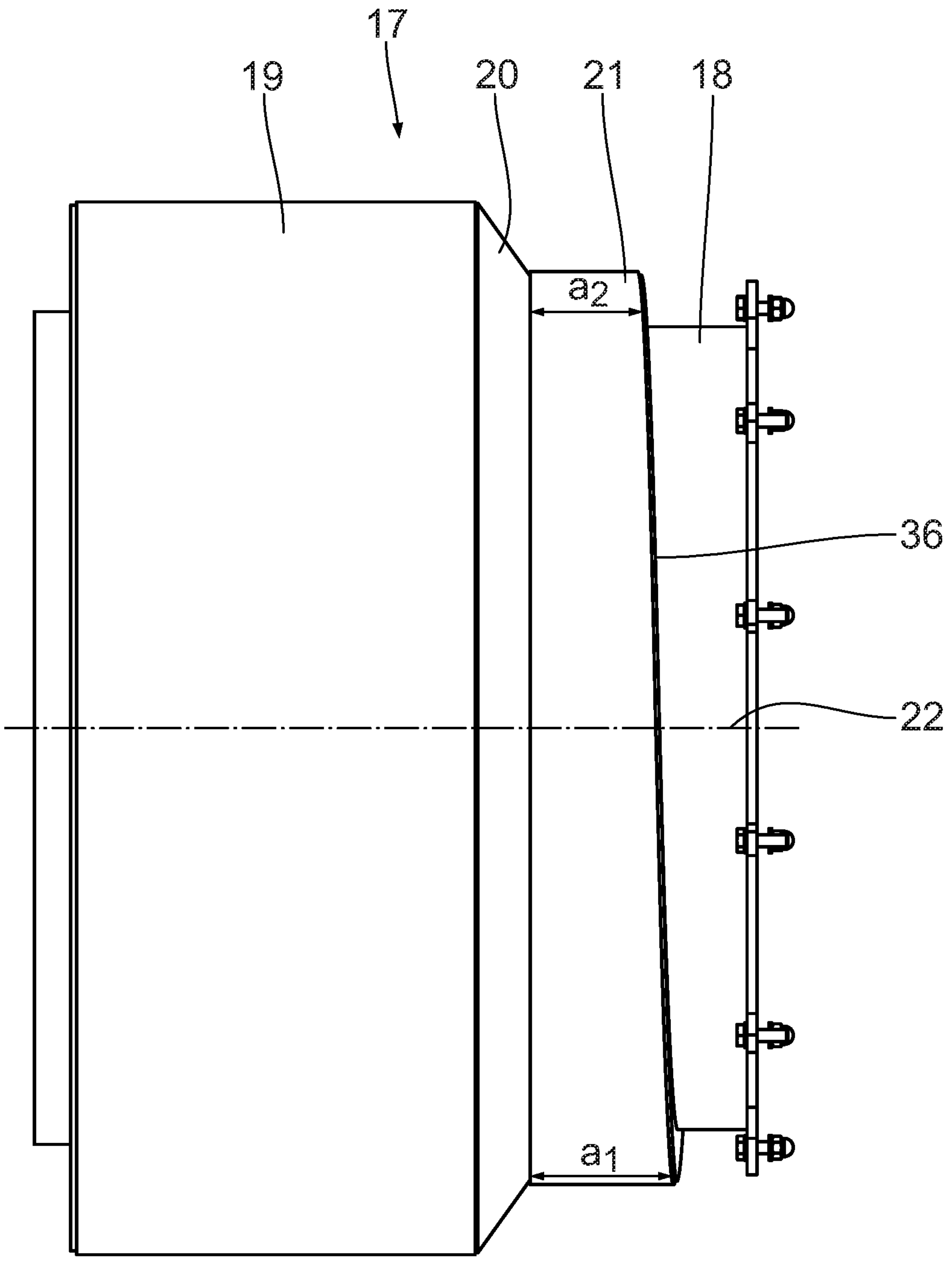
FIG. 6 is a view according to arrow VI in FIG. 3.
Figure 7:
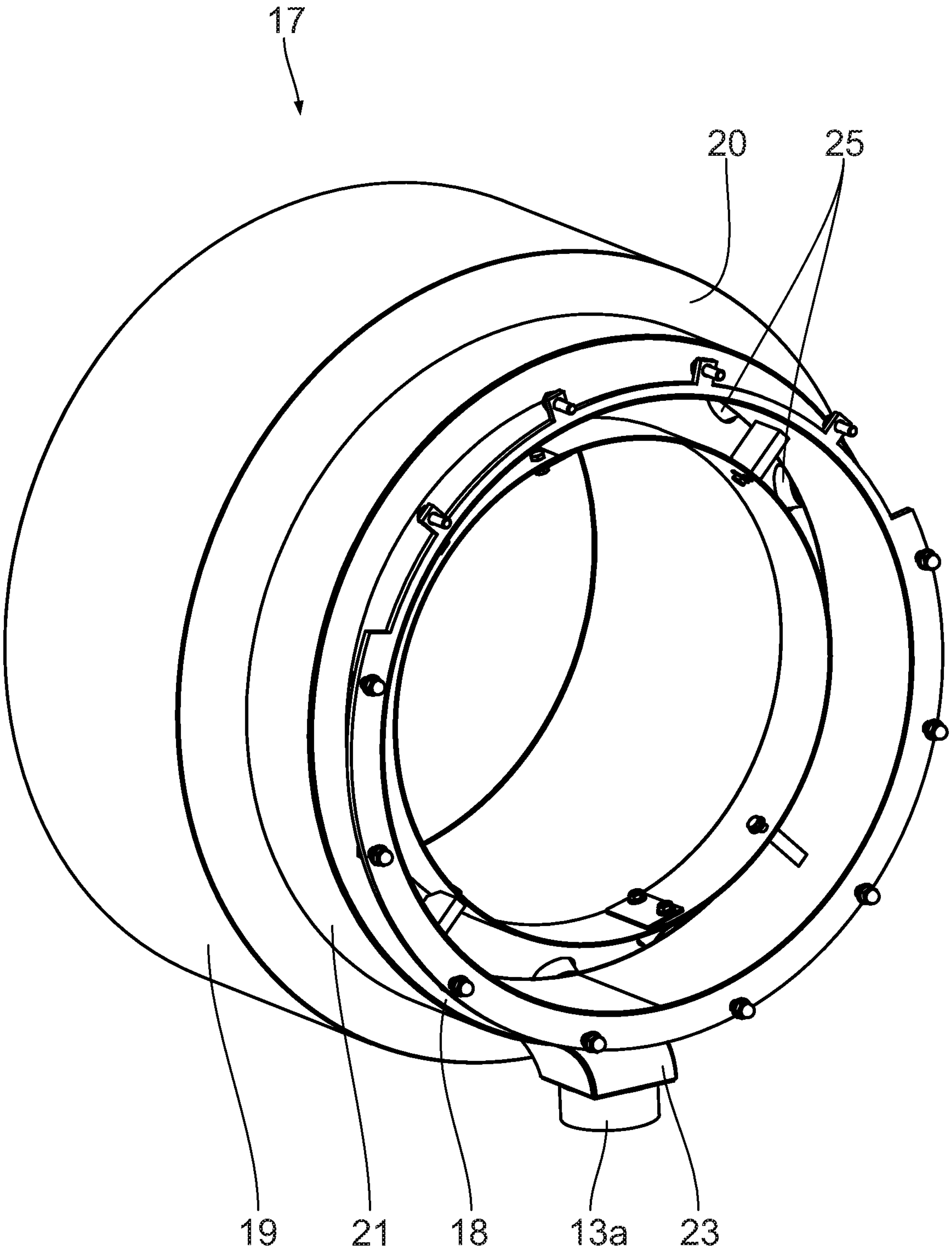
FIG. 7 is a perspective view of the burner head with the distribution ring from behind.
Figure 8:
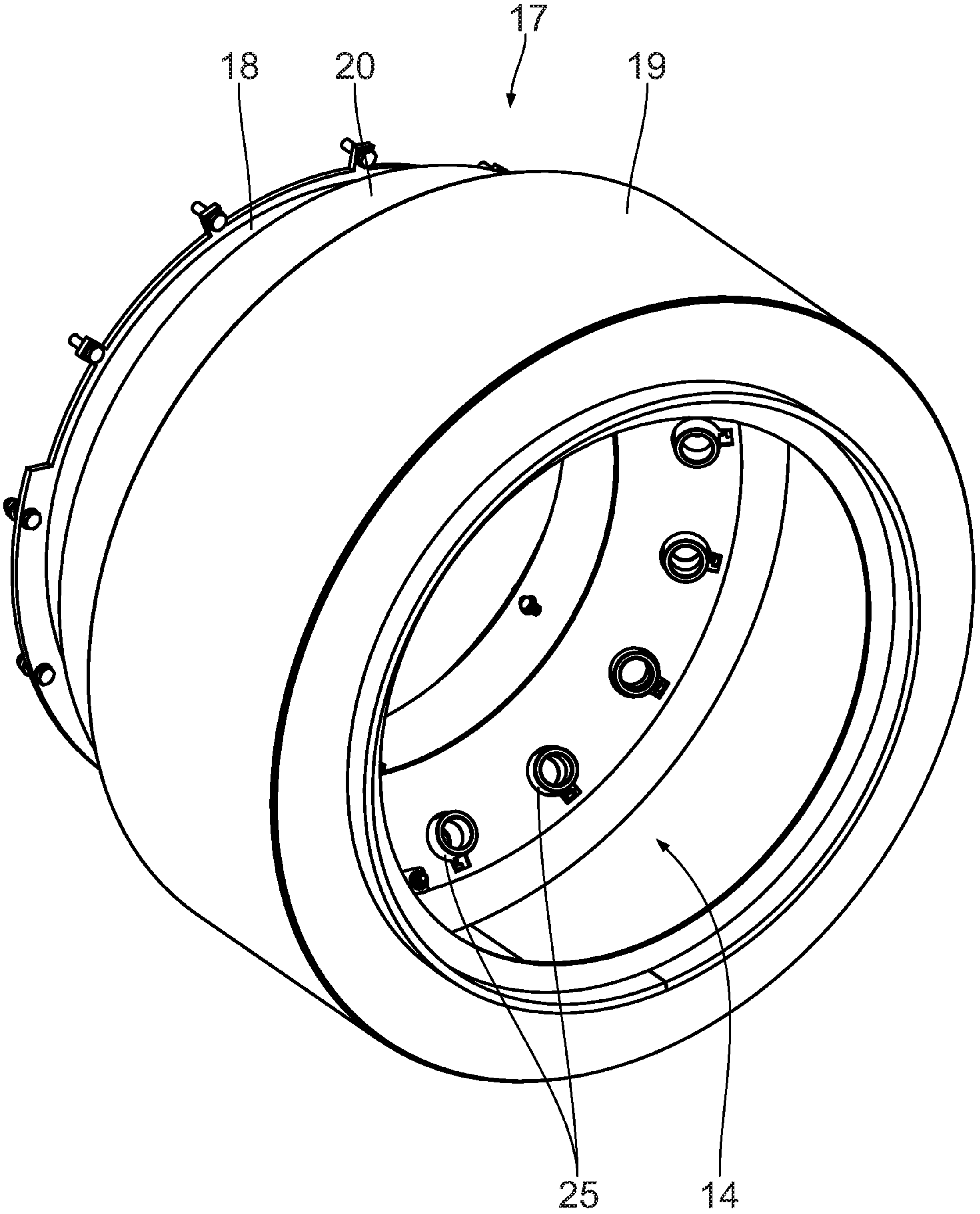
FIG. 8 is a perspective view from the front corresponding to FIG. 7.
Figure 9:
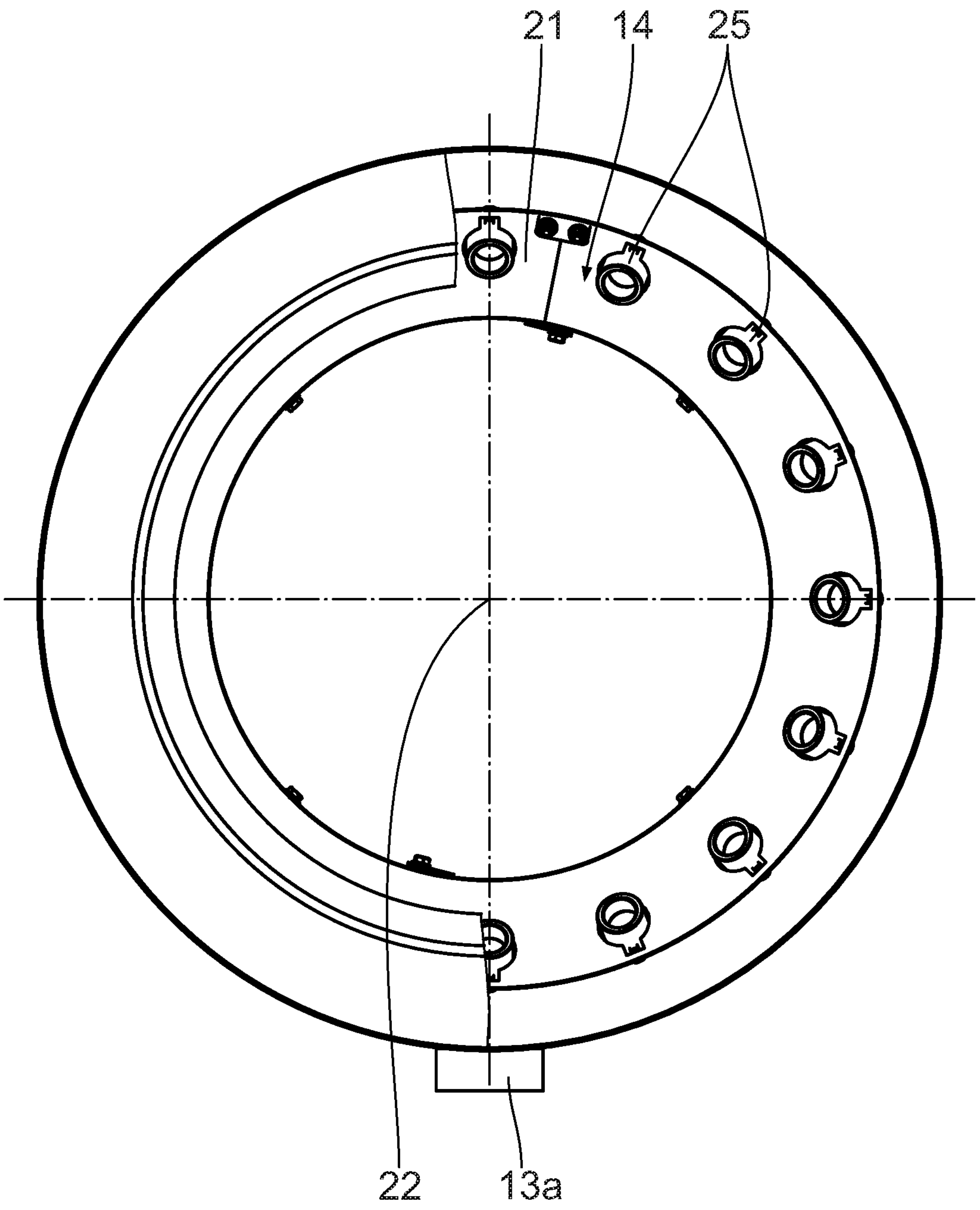
FIG. 9 is a partially sectioned view according to arrow IX in FIG. 3.

The circumferentially reducing axial extension a is in particular evident from the top view onto the burner head 17 in FIG. 6. A first axial extension a1 marked in FIG. 6 bottom is greater than a second axial extension a2 marked in FIG. 6 top. The reason for this is that the rear side wall 36, which defines the first axial edge 28, is arranged to be inclined with respect to a normal plane of the longitudinal axis 22. The greater the inclination of the side wall 36 with respect to the normal plane, the greater the axial conveyance of the fuel particles. In particular, the rear side wall 36 is configured to be helical.

The operation of the burner 7 and in particular the distribution ring 14 is explained in more detail below. The burner 7 is operated to supply heat to the drying drum 3. For this purpose, in particular sucked-in ambient air 10*a* is fed to the burner 7 via the air supply 10, and fuel, in particular sol-id fuel particles, is fed to the burner 7 via the primary fuel supply 12*a*, 13*a*. If necessary, further fuel, in particular secondary fuel and/or support fuel, can be supplied from the at least one secondary fuel source 12, 12*b* via the at least one secondary fuel supply 13, 13*b*. By means of the swirling element 16 and the distribution ring 14, an advantageous fuel-air mixture is generated in the burner head 17, which mixture is ignited by means of a pilot burner 37 and a burner flame is produced.

Depending on the property of the solid fuel, it may be necessary for the pilot burner 37 to first ignite a supporting flame that is created from a secondary fuel before the solid fuel, i.e. the primary fuel, is ignited. For the ignition of the supporting flame, the secondary fuel flows into the burner 7 via the secondary fuel supply lines 13, 13*b*.

Figure 4:
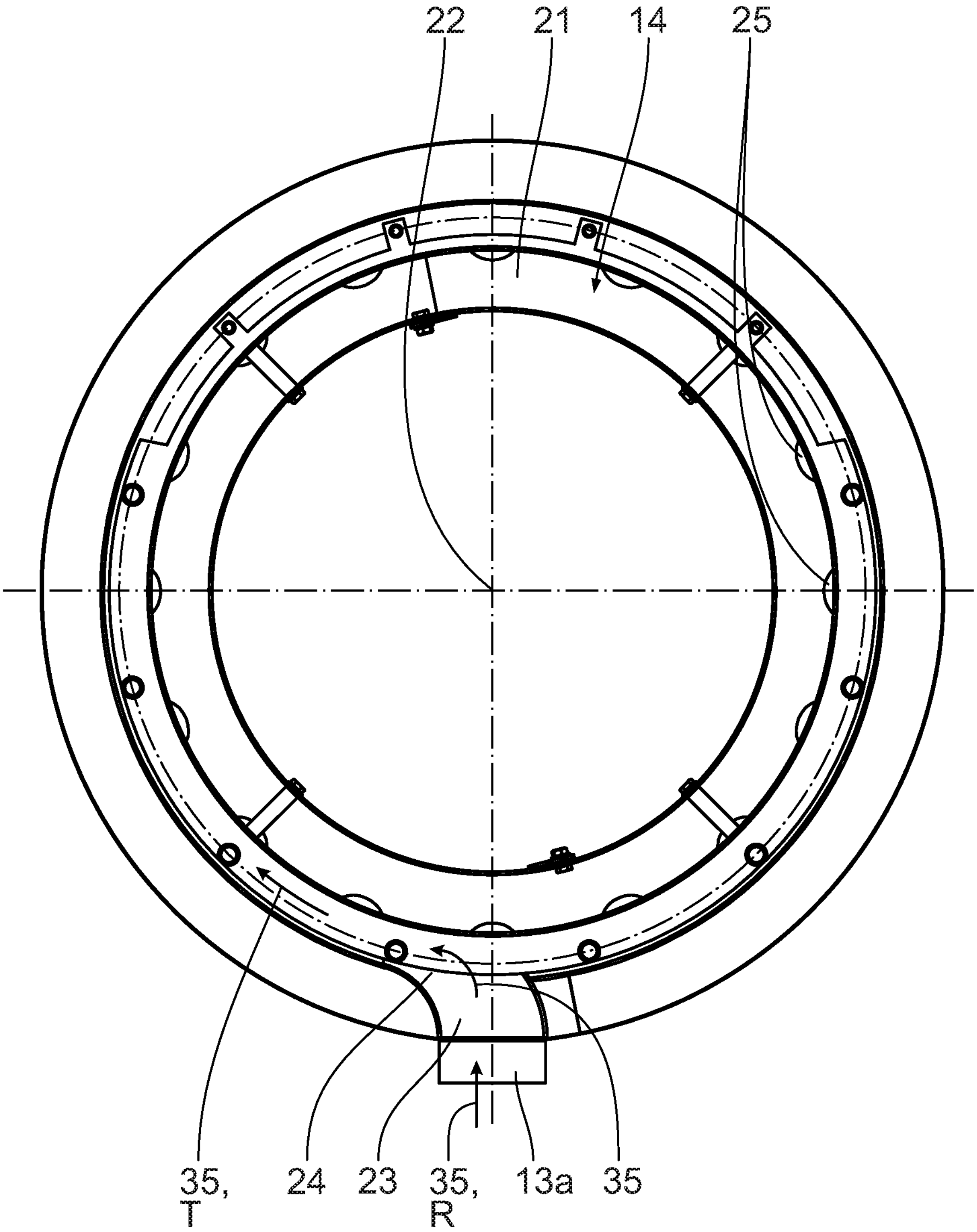
FIG. 4 is a view according to arrow IV in FIG. 3.

The fuel particles are fed via the distribution ring 14 starting from the fuel source 12*a* via the fuel supply line 13*a*, which is connected to the feed spigot 23. From there, the fuel particle-air mixture is deflected from a radial current R into a tangential current T and fed into the hollow body 21. The corresponding flow arrows 35 are shown in FIG. 4. In the hollow body 21, the fuel particles flow essentially in the circumferential direction around the longitudinal axis 22.

This circumferential current is superimposed by an axial current proportion, i.e. a flow direction along the longitudinal axis 22 towards the dis-charge spigots 25. This axial current proportion is caused by the continuously decreasing axial extension of the hollow body 21.

As a result of the centrifugal forces acting on the current particles in the hollow body 21, the fuel particles are moved towards the outer edge 26 in the hollow body 21. Due to the fact that the discharge spigots 25 are arranged in the region of the outer edge 26 of the hollow body 21, the fuel particles can be discharged, in particular automatically and in particular without residue, from the hollow body 21 via the discharge spigots 25 into the burner head 17 towards the burner flame. Blocking or clogging of the discharge spigots 25 is avoided.

While specific embodiments of the invention have been shown and described in detail to illustrate the application of the principles of the invention, it will be understood that the invention may be embodied otherwise without departing from such principles.

What is claimed is:

1. A distribution ring for fuel comprising solid particles in a burner, wherein the solid particles of the fuel are fed into said distribution ring by means of compressed air, the distribution ring comprising:

- a hollow body which is configured to be annular with respect to a longitudinal axis;
- a feed spigot which is connected to the hollow body for feeding the fuel into the hollow body; and
- a plurality of discharge spigots which are configured to discharge fuel from the hollow body to the burner, wherein each of the plurality of discharge spigots is arranged externally at the hollow body in a radial direction of the longitudinal axis, wherein the hollow body has a polygonal inner contour in a sectional plane containing the longitudinal axis, wherein an outer edge, oriented with respect to the radial direction, is oriented at least in sections parallel to the longitudinal axis.

2. A distribution ring according to claim 1, wherein the plurality of discharge spigots are spaced apart from each other in a circumferential direction with respect to the longitudinal axis.

3. A distribution ring according to claim 1, wherein the plurality of discharge spigots are uniformly spaced apart from each other in a circumferential direction with respect to the longitudinal axis.

4. A distribution ring according to claim 1, wherein each of the plurality of discharge spigots has a spigot longitudinal axis which is arranged inclined with respect to the longitudinal axis at an angle of inclination (n), wherein $0^\circ<n<90^\circ$.

5. A distribution ring according to claim 4, wherein $15^\circ<n<75^\circ$.

6. A distribution ring according to claim 4, wherein $30^\circ<n<60^\circ$.

7. A distribution ring according to claim 4, wherein each spigot longitudinal axis intersects each other spigot longitudinal axis at one point.

8. A distribution ring according to claim 4, wherein the spigot longitudinal axes of each of the discharge spigots intersect at one point which is located on the longitudinal axis.

9. A distribution ring according to claim 1, further comprising a nozzle attachment detachably mounted on each of the discharge spigots.

10. A distribution ring for fuel comprising solid particles in a burner, wherein the solid particles of the fuel are fed into said distribution ring by means of compressed air, the distribution ring comprising:

- a hollow body which is configured to be annular with respect to a longitudinal axis;
- a feed spigot which is connected to the hollow body for feeding the fuel into the hollow body; and
- a plurality of discharge spigots which are configured to discharge fuel from the hollow body to the burner, wherein each of the plurality of discharge spigots is arranged externally at the hollow body in a radial direction of the longitudinal axis, wherein the hollow body has an axial extension that is oriented parallel to the longitudinal axis and is variable in a circumferential direction with respect to the longitudinal axis.

11. A distribution ring according to claim 10, wherein the axial extension is at a maximum at an opening point of the feed spigot into the hollow body.

12. A distribution ring according to claim 10, wherein the axial extension decreases in a conveying direction of the fuel.

13. A distribution ring according to claim 10, wherein the axial extension decreases continuously in a conveying direction of the fuel.

14. A burner comprising:

- an air supply;
- a fuel feed configured to feed a fuel comprising solid particles; and
- a distribution ring connected to the fuel feed wherein said solid particles are fed into the distribution ring by means of compressed air from the air supply, the distribution ring comprising:
  - a hollow body which is configured to be annular with respect to a longitudinal axis;
  - a feed spigot which is connected to the hollow body for feeding the fuel into the hollow body; and
  - a plurality of discharge spigots which are configured to discharge fuel from the hollow body to the burner, wherein each of the plurality of discharge spigots is arranged externally at the hollow body in a radial direction of the longitudinal axis, wherein the hollow body has a polygonal inner contour in a sectional plane containing the longitudinal axis, wherein an outer edge, oriented with respect to the radial direction, is oriented at least in sections parallel to the longitudinal axis.

15. A burner according to claim 14, wherein each of the plurality of discharge spigots has a spigot longitudinal axis which is arranged inclined with respect to the longitudinal axis at an angle of inclination (n), wherein $0° < n < 90°$.

16. A burner according to claim 14, wherein the distribution ring further comprises a nozzle attachment detachably mounted on each of the plurality of discharge spigots.

17. A burner comprising:

an air supply;

a fuel feed configured to feed a fuel comprising solid particles; and a distribution ring connected to the fuel feed wherein said solid particles are fed into the distribution ring by means of compressed air from the air supply, the distribution ring comprising:

a hollow body which is configured to be annular with respect to a longitudinal axis;

a feed spigot which is connected to the hollow body for feeding the fuel into the hollow body; and a plurality of discharge spigots which are configured to discharge fuel from the hollow body to the burner, wherein each of the plurality of discharge spigots is arranged externally at the hollow body in a radial direction of the longitudinal axis, wherein the hollow body has an axial extension that is oriented parallel to the longitudinal axis and that varies in a circumferential direction with respect to the longitudinal axis.

18. A drying drum comprising a burner, the burner comprising:

an air supply;

a fuel feed configured to feed a fuel comprising solid particles; and a distribution ring connected to the fuel feed wherein said solid particles are fed into the distribution ring by means of compressed air from the air supply, the distribution ring comprising:

a hollow body which is configured to be annular with respect to a longitudinal axis;

a feed spigot which is connected to the hollow body for feeding the fuel into the hollow body; and a plurality of discharge spigots which are configured to discharge fuel from the hollow body to the burner, wherein each of the plurality of discharge spigots is arranged externally at the hollow body in a radial direction of the longitudinal axis, wherein the hollow body has a polygonal inner contour in a sectional plane containing the longitudinal axis, wherein an outer edge, oriented with respect to the radial direction, is oriented at least in sections parallel to the longitudinal axis.

* * * * *